(12) United States Patent
Hori et al.

(10) Patent No.: US 12,036,513 B2
(45) Date of Patent: Jul. 16, 2024

(54) DESALINATION PERFORMANCE RESTORATION AGENT FOR CELLULOSE ACETATE MEMBRANE AND DESALINATION PERFORMANCE RESTORATION METHOD FOR CELLULOSE ACETATE MEMBRANE

(71) Applicants: MITSUBISHI HEAVY INDUSTRIES, LTD., Tokyo (JP); KYOEISHA CHEMICAL CO., LTD., Osaka (JP)

(72) Inventors: Takayoshi Hori, Kanagawa (JP); Katsunori Matsui, Kanagawa (JP); Sho Yokogawa, Kanagawa (JP); Yoshiaki Ito, Tokyo (JP); Ryo Kamito, Tokyo (JP); Yoshihisa Katsunishi, Nara (JP); Atsuyoshi Ueda, Nara (JP); Takahiro Masui, Nara (JP)

(73) Assignees: MITSUBISHI HEAVY INDUSTRIES, LTD., Tokyo (JP); KYOEISHA CHEMICAL CO., LTD., Osaka (JP)

( * ) Notice: Subject to any disclaimer, the term of this patent is extended or adjusted under 35 U.S.C. 154(b) by 0 days.

(21) Appl. No.: 17/633,758

(22) PCT Filed: Oct. 20, 2020

(86) PCT No.: PCT/JP2020/039353
§ 371 (c)(1),
(2) Date: Jul. 13, 2022

(87) PCT Pub. No.: WO2021/079867
PCT Pub. Date: Apr. 29, 2021

(65) Prior Publication Data
US 2022/0355253 A1    Nov. 10, 2022

(30) Foreign Application Priority Data

Oct. 24, 2019    (JP) .................. 2019-193701

(51) Int. Cl.
*B01D 65/06* (2006.01)
*B01D 67/00* (2006.01)
(Continued)

(52) U.S. Cl.
CPC ............. *B01D 65/06* (2013.01); *B01D 67/00* (2013.01); *B01D 69/12* (2013.01); *B01D 71/16* (2013.01); *B01D 2321/162* (2013.01)

(58) Field of Classification Search
None
See application file for complete search history.

(56) References Cited

U.S. PATENT DOCUMENTS 3,536,518 A    10/1970    Herbert
3,877,978 A    4/1975    Kreman et al.
(Continued)

FOREIGN PATENT DOCUMENTS

AU    2013247863    10/2013
AU    2013365015    6/2014
(Continued)

OTHER PUBLICATIONS

Extended European Search Report dated Oct. 5, 2023 in corresponding European Patent Application No. 20878758.0.
(Continued)

*Primary Examiner* — Krishnan S Menon
(74) *Attorney, Agent, or Firm* — Wenderoth, Lind & Ponack, L.L.P.

(57) ABSTRACT

A desalination performance restoration agent for a cellulose acetate membrane contains: a solvent; and a modified polyvinyl alcohol mixed in the solvent. The modified polyvinyl alcohol has an acetyl group structure in at least part of polyvinyl alcohol.

17 Claims, 10 Drawing Sheets

(51) Int. Cl.
 B01D 69/12 (2006.01)
 B01D 71/16 (2006.01)

(56) References Cited

U.S. PATENT DOCUMENTS

| | | |
|---|---|---|
| 2009/0032466 A1 | 2/2009 | Kawakatsu et al. |
| 2009/0266764 A1 | 10/2009 | Kawakatsu |
| 2011/0168626 A1 | 7/2011 | Tanaka et al. |
| 2013/0324664 A1 | 12/2013 | Kawakatsu et al. |
| 2013/0324678 A1 | 12/2013 | Kawakatsu et al. |
| 2015/0306545 A1 | 10/2015 | Hayakawa et al. |

FOREIGN PATENT DOCUMENTS

| | | | | |
|---|---|---|---|---|
| CN | 104 119 748 | | 10/2014 | |
| CN | 106268332 A | * | 1/2017 | ........... B01D 61/362 |
| CN | 107 973 505 | | 5/2018 | |
| EP | 3 299 081 | | 3/2018 | |
| JP | 51-13388 | | 2/1976 | |
| JP | 53-28083 | | 3/1978 | |
| JP | 62-30509 | | 2/1987 | |
| JP | S63-30582 | | 2/1988 | |
| JP | 11-156168 | | 6/1999 | |
| JP | 3637750 | | 4/2005 | |
| JP | 2006-110520 | | 4/2006 | |
| JP | 2009-101335 | | 5/2009 | |
| JP | 2011-72861 | | 4/2011 | |
| JP | 4868108 | | 2/2012 | |
| JP | 4872813 | | 2/2012 | |
| JP | 4968027 | | 7/2012 | |
| JP | 5018306 | | 9/2012 | |
| JP | 5050536 | | 10/2012 | |
| JP | 2013-169514 | | 9/2013 | |
| JP | 2013-215678 | | 10/2013 | |
| JP | 2014-50783 | | 3/2014 | |
| JP | 2014-121681 | | 7/2014 | |
| JP | 5568835 | | 8/2014 | |
| JP | 2015-97990 | | 5/2015 | |
| JP | 5772083 | | 9/2015 | |
| JP | 5914973 | | 5/2016 | |
| JP | 2016-128142 | | 7/2016 | |
| JP | 6251953 | | 12/2017 | |
| JP | 2018-47406 | | 3/2018 | |
| SU | 886874 | | 12/1981 | |
| WO | 2007/114308 | | 10/2007 | |
| WO | 2009/044655 | | 4/2009 | |
| WO | 2014/103822 | | 7/2014 | |
| WO | WO-2019138880 A1 | * | 7/2019 | ............. B01D 61/02 |

OTHER PUBLICATIONS

International Search Report dated Nov. 24, 2020 in corresponding International Application No. PCT/JP2020/039353.
Communication pursuant to Article 94(3) EPC dated Jun. 4, 2024, issued to the corresponding EP application No. 20 878 758.0.

* cited by examiner

DESALINATION PERFORMANCE RESTORATION AGENT FOR CELLULOSE ACETATE MEMBRANE AND DESALINATION PERFORMANCE RESTORATION METHOD FOR CELLULOSE ACETATE MEMBRANE

TECHNICAL FIELD

The present disclosure relates to a desalination performance restoration agent for a cellulose acetate membrane and a desalination performance restoration method for a cellulose acetate membrane.

BACKGROUND

Patent Document 1 discloses a method of passing an aqueous solution containing polyphenol through a deteriorated reverse osmosis membrane to repair the deteriorated reverse osmosis membrane and restore the desalination performance of the reverse osmosis membrane. In this method, the desalination performance of the reverse osmosis membrane is restored by passing an aqueous solution containing one or two or more members selected from the group consisting of modified polyvinyl alcohols and polyamino acids through the deteriorated reverse osmosis membrane.

In the method for restoring the desalination performance described in Patent Document 1, polyamide-based materials such as aromatic polyamides, aliphatic polyamides, and composite materials thereof and cellulose-based materials such as cellulose acetate are mentioned as examples of the reverse osmosis membrane to be restored in desalination performance.

CITATION LIST

Patent Literature

Patent Document 1: JP6251953B

SUMMARY

Problems to be Solved

In water production using a reverse osmosis membrane, there are two types of reverse osmosis membranes: a polyamide membrane and a cellulose acetate membrane. Since the desalination performance of the reverse osmosis membrane inevitably deteriorates but the periodic replacement and disposal of the membrane are costly, desalination performance restoration agents have being developed to reduce this cost. In recent years, desalination performance restoration agents for polyamide membranes have been developed, but no development results and practical techniques of desalination performance restoration agents for cellulose acetate membranes have been found.

Further, although Patent Document 1 mentions the polyamide membrane and the cellulose acetate membrane in the same way as the reverse osmosis membrane to which the desalination performance restoration method is applied, the effect of the desalination performance restoration method described in Patent Document 1 is limited when the cellulose acetate membrane is targeted.

In view of the above, an object of the present disclosure is to provide a desalination performance restoration agent for a cellulose acetate membrane and a desalination performance restoration method for a cellulose acetate membrane with a high effect of restoring the desalination performance of the cellulose acetate membrane.

Solution to the Problems

To accomplish the above object, a desalination performance restoration agent for a cellulose acetate membrane according to the present disclosure comprises: a solvent; and a modified polyvinyl alcohol mixed in the solvent, and the modified polyvinyl alcohol has an acetyl group structure in at least part of polyvinyl alcohol.

To accomplish the above object, a desalination performance restoration method for a cellulose acetate membrane according to the present disclosure comprises a step of bringing a desalination performance restoration agent that contains a solvent and a modified polyvinyl alcohol having an acetyl group structure in at least part of polyvinyl alcohol into contact with a cellulose acetate membrane.

Advantageous Effects

The present disclosure provides a desalination performance restoration agent for a cellulose acetate membrane and a desalination performance restoration method for a cellulose acetate membrane with a high effect of restoring the desalination performance of the cellulose acetate membrane.

DETAILED DESCRIPTION

Figure 1:
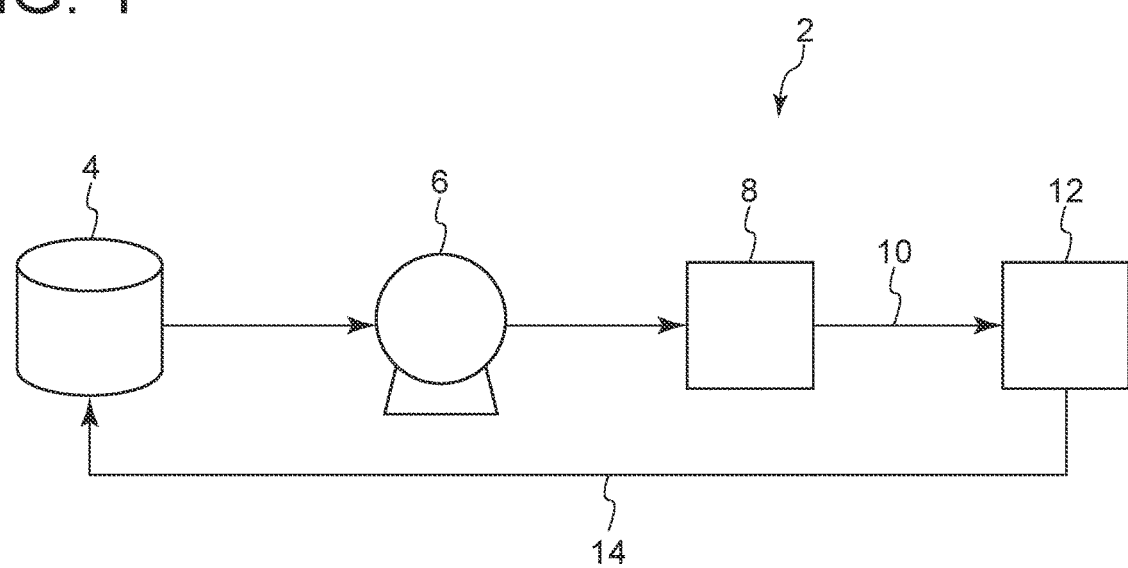
FIG. 1 is a schematic configuration diagram of a cleaning device for cleaning a cellulose acetate membrane.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

In a water production plant such as a desalination apparatus equipped with a reverse osmosis membrane, impurities such as solid substances are removed from water to be treated by a pretreatment device, and then the water is pressurized by a high-pressure pump and brought into contact with the reverse osmosis membrane to separate it into fresh water that permeates the reverse osmosis membrane and concentrated seawater that does not permeate the reverse osmosis membrane. The operation of the reverse osmosis membrane may cause clogging due to the adhesion of scales including metal compounds such as iron and manganese and organisms including microorganisms and their metabolites contained in water as a factor of decrease in the permeation performance. In this case, cleaning is necessary to wash off the dirt on a regular basis. In addition, there are two types of reverse osmosis membranes: one is a polyamide membrane and the other is a cellulose acetate membrane, and different factors affect their decrease in the desalination performance due to the operation of the reverse osmosis membrane. The inventors have speculated that, in the case of the cellulose acetate membrane, acetyl groups on the surface of the membrane contribute to the desalination performance, and the operation causes the acetyl groups of the cellulose acetate membrane to decrease and change into hydroxyl groups (hydrolysis). They have thus investigated various desalination performance restoration agents to confirm the effect of a modified polyvinyl alcohol having an acetyl group structure in at least part of polyvinyl alcohol.

The water production plant using the cellulose acetate membrane is, for example, a seawater desalination plant for desalinating seawater, or a plant for desalinating groundwater containing salt.

The desalination performance restoration agent according to the present disclosure is a desalination performance restoration agent for a cellulose acetate membrane and is used to restore the desalination performance of the cellulose acetate membrane as the reverse osmosis membrane. The desalination performance restoration agent according to the present disclosure contains a solvent and a modified polyvinyl alcohol mixed in the solvent. The modified polyvinyl alcohol contained in the desalination performance restoration agent has an acetyl group structure in at least part of polyvinyl alcohol. In other words, the desalination performance restoration agent according to the present disclosure contains a modified polyvinyl alcohol having a structure in which hydrogen atoms of at least some hydroxyl groups of polyvinyl alcohol are replaced with acetyl groups.

The desalination performance restoration agent according to the present disclosure contains, for example, water as the solvent in addition to the modified polyvinyl alcohol. In this case, the solvent (water) and the modified polyvinyl alcohol added to the water and dispersed in the water constitute the desalination performance restoration agent.

In some embodiments, the desalination performance restoration treatment of the cellulose acetate membrane with the desalination performance restoration agent is performed using a cleaning device 2 shown in FIG. 1, for example.

The cleaning device 2 shown in FIG. 1 includes a tank 4, a pump 6, a filter 8, and a circulation line 10. The desalination performance restoration agent stored in the tank 4 is pumped by the pump 6 and supplied to the cellulose acetate membrane 12 via the circulation line 10, comes into contact with the entire cellulose acetate membrane 12, passes through the cellulose acetate membrane 12, and is then returned to the tank 4 through a pipe 14 for concentrated water. The desalination performance restoration agent returned to the tank 4 is pumped by the pump 6 and supplied to the cellulose acetate membrane 12 again to circulate through the circulation line 10. Thus, the desalination performance restoration treatment (desalination performance restoration method) according to the present disclosure includes at least a step of bringing the desalination performance restoration agent that contains the modified polyvinyl alcohol into contact with the cellulose acetate membrane. Specifically, the desalination performance restoration treatment in the present disclosure involves passing the desalination performance restoration agent that contains the modified polyvinyl alcohol through the cellulose acetate membrane and bringing it into contact with the cellulose acetate membrane to coat the surface of the cellulose acetate membrane with the modified polyvinyl alcohol, which repairs deteriorated portions of the cellulose acetate membrane.

The cellulose acetate membrane has acetyl groups, and the acetyl groups contribute to the desalination performance of the cellulose acetate membrane. When the cellulose acetate membrane is used as the reverse osmosis membrane, the number of acetyl groups of the cellulose acetate membrane decreases due to hydrolysis and the number of hydroxyl groups increases (the cellulose acetate membrane deteriorates) with the passage of time, and the desalination performance of the cellulose acetate membrane deteriorates.

In this regard, the desalination performance restoration agent according to the present disclosure contains the modified polyvinyl alcohol having an acetyl group structure in at least part of polyvinyl alcohol, so that hydrophobic acetyl groups remaining in the deteriorated cellulose acetate membrane and hydrophobic acetyl groups of the modified polyvinyl alcohol in the desalination performance restoration agent are easily adsorbed each other due to their hydrophobicity. This allows the modified polyvinyl alcohol to effectively coat the cellulose acetate membrane. Further, the acetyl groups of the modified polyvinyl alcohol adsorbed on the cellulose acetate membrane contribute to the desalination performance of the cellulose acetate membrane, so that the desalination performance of the cellulose acetate membrane can be effectively restored.

Figure 2:
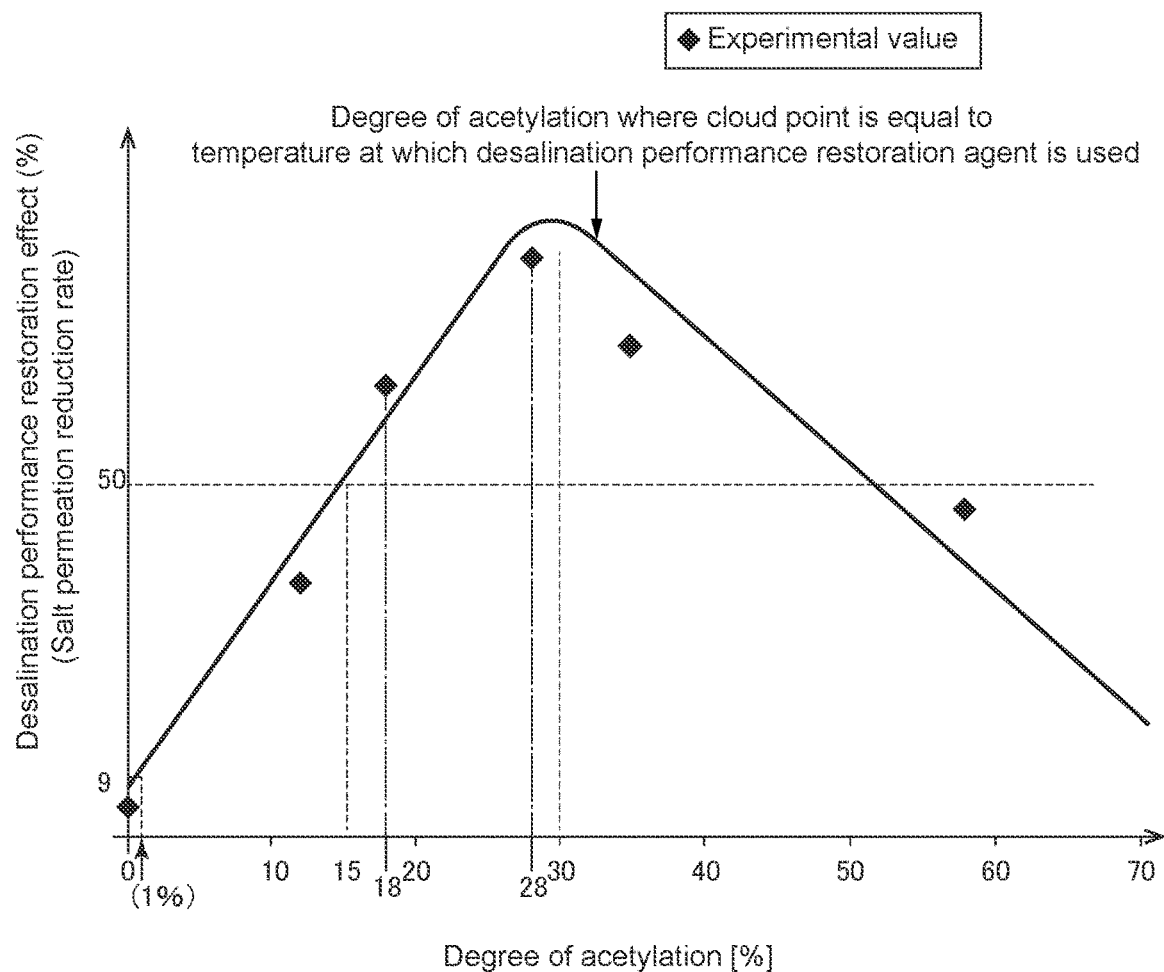
FIG. 2 is a diagram showing a relationship between the desalination performance restoration effect and the degree of acetylation of modified polyvinyl alcohol in the desalination performance restoration agent of the present disclosure.

FIG. 2 is a diagram showing a relationship between the desalination performance restoration effect on the cellulose acetate membrane and the degree of acetylation of the modified polyvinyl alcohol in the desalination performance restoration agent.

Here, the "degree of acetylation" in the present disclosure means a value expressed as a percentage of B/(A+B), where A is the molar amount of hydroxyl groups in the modified polyvinyl alcohol contained in the desalination performance restoration agent, and B is the molar amount of acetyl groups in the modified polyvinyl alcohol. The desalination performance restoration effect (%) means the salt permeation reduction rate (%) of the cellulose acetate membrane due to the desalination performance restoration treatment, and the higher the salt permeation reduction rate of the cellulose acetate membrane, the higher the desalination performance restoration effect. The salt permeation reduction rate is a rate of reduction in the permeation velocity of chlorine ions through the cellulose acetate membrane under a certain operating condition before and after the desalination performance restoration treatment.

The conditions under which the experimental values shown in FIG. 2 were obtained are as follows: the concentration and degree of polymerization of the modified polyvinyl alcohol in the desalination performance restoration agent, the temperature and pH of the desalination performance restoration agent, and the circulation time of the desalination performance restoration agent (the time it takes for the desalination performance restoration agent to pass through the cellulose acetate membrane) are all fixed.

As shown in FIG. 2, it was found that there is a correlation between the desalination performance restoration effect and the degree of acetylation of the modified polyvinyl alcohol in the desalination performance restoration agent. In the example shown in FIG. 2, in the range where the degree of acetylation of the modified polyvinyl alcohol contained in the desalination performance restoration agent is 0% to 30%, the more the degree of acetylation, the higher the desalination performance restoration effect.

When the desalination performance restoration effect is small, the period for water quality to return to original water quality level (the period from when the desalination performance restoration treatment is performed until the water quality returns to the water quality level before the desalination performance restoration treatment is performed) is short. In addition, the desalination performance restoration treatment requires stopping water production (desalination of saline water) in the water production plant using the cellulose acetate membrane, and thus the availability of the water production plant using the cellulose acetate membrane decreases as the frequency of desalination performance restoration treatment increases. The water production plant is, for example, a seawater desalination plant for desalinating seawater, or a plant for desalinating groundwater containing salt.

Figure 3:
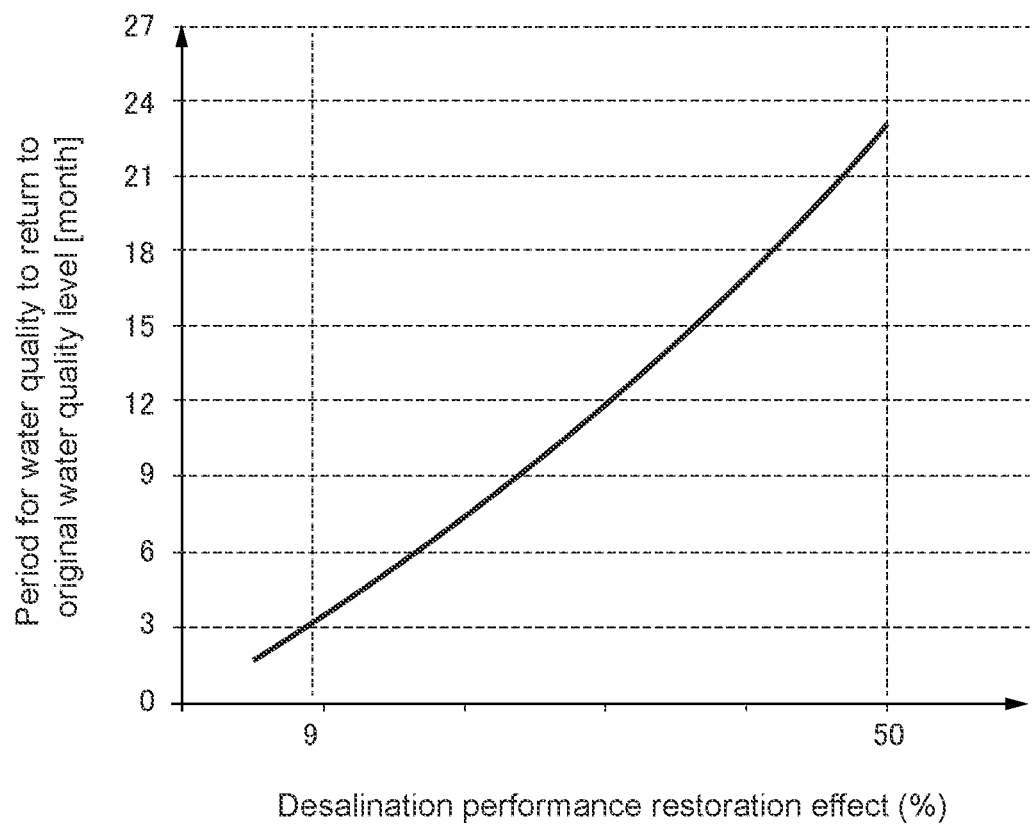
FIG. 3 is a diagram showing a relationship between the period for water quality to return to original water quality level and the desalination performance restoration effect of the desalination performance restoration agent of the present disclosure.

In view of the above, the lower limit of the degree of acetylation of the modified polyvinyl alcohol may be decided in consideration of the frequency of maintenance of the water production plant using the cellulose acetate membrane. For example, generally, in a water production plant using a cellulose acetate membrane, the cellulose acetate membrane is clogged, and in this case, cleaning is performed to wash off the dirt on the membrane on a regular basis. For example, the frequency of cleaning in a typical water production plant is 4 times or less per year (at intervals of 3 months or more) in order to ensure the plant availability which affects the profitability of water production as much as possible. Therefore, when the period for water quality to return to the original level is 3 months or longer, the conventional availability of the water production plant can be ensured by performing the desalination performance restoration treatment as part of the conventional cleaning work, and the reduction in the availability of the water production plant due to the conventional desalination performance restoration treatment can be suppressed. Here, as shown in FIG. 3, as the desalination performance restoration effect increases, the period for water quality to return to the original level is extended. When the period for water quality to return to the original level is 3 months, which is the frequency of cleaning in a typical water production plant, and the desalination performance restoration treatment is performed every 3 months, the required desalination performance restoration effect is 9%, and in FIG. 2, the degree of acetylation that results in a desalination performance restoration effect of 9% or higher is 1% or more.

For this reason, the degree of acetylation of the modified polyvinyl alcohol in the desalination performance restoration agent is preferably 1% or more. In this case, the frequency of desalination performance restoration treatment using the desalination performance restoration agent can be set to three months or longer (four times or less per year), and the reduction in the availability of the water production plant caused by the desalination performance restoration treatment can be suppressed.

In FIG. 3, when the desalination performance restoration effect is 50%, the period for water quality to return to the original level is about 2 years. In other words, when the desalination performance restoration effect is 50%, the period until the cellulose acetate membrane requires the next desalination performance restoration treatment is about 2 years, and the life can be extended by about 2 years.

Figure 4:
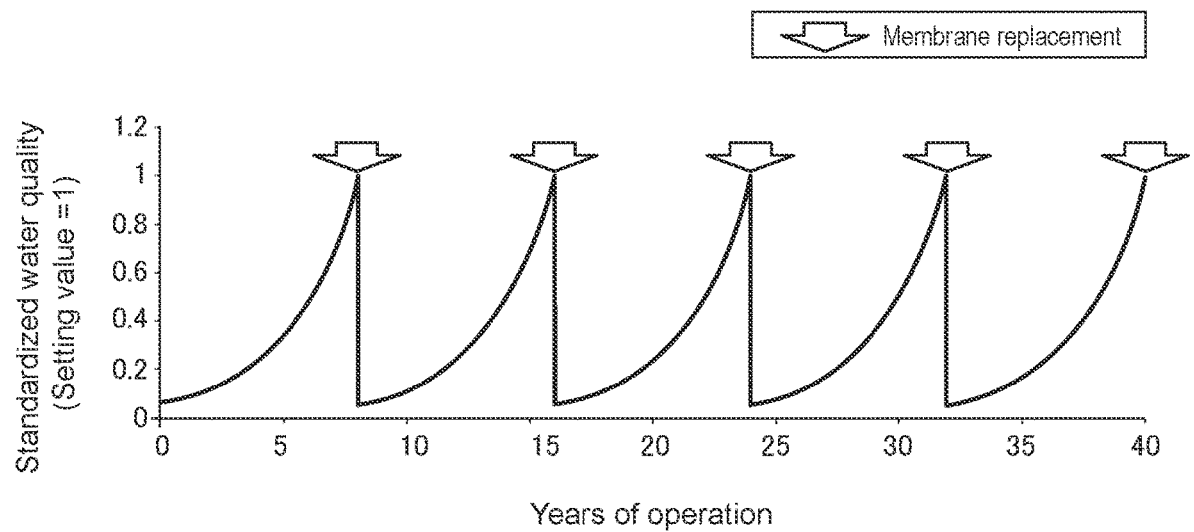
FIG. 4 is a diagram showing a relationship between the standardized water quality and the year of operation of the water production plant when the desalination performance restoration treatment of the present disclosure is not performed.
Figure 5:
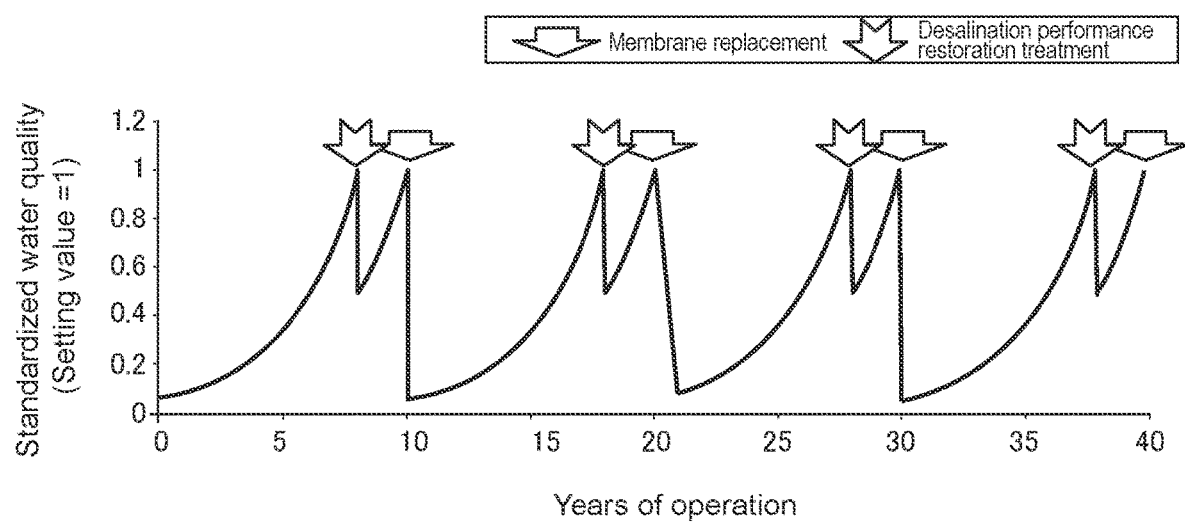
FIG. 5 is a diagram showing a relationship between the standardized water quality and the year of operation of the water production plant when the desalination performance restoration treatment of the present disclosure is performed.

FIG. 4 is a diagram showing a relationship between the standardized water quality and the year of operation of the water production plant when the desalination performance restoration treatment of the present disclosure is not performed. The horizontal axis is the year of operation, and the vertical axis is the standardized water quality, which shows the situation until the performance of the cellulose acetate membrane decreases with operation to a design value (standardized to 1.0) where the cellulose acetate membrane needs to be replaced. FIG. 5 is a diagram showing a relationship between the standardized water quality and the year of operation of the water production plant when the desalination performance restoration treatment of the present disclosure is performed.

It is generally known that the performance of the cellulose acetate membrane decreases exponentially and the water quality reaches a value that needs to be replaced. When the life of the cellulose acetate membrane in this disclosure is, for example, eight years, the cellulose acetate membrane needs to be replaced once every eight years, as shown in FIG. 4. In FIG. 4, when the year of operation reaches 8 years, the performance of the cellulose acetate membrane decreases, and the water quality reaches the design value (standardized to 1.0) that needs to be replaced. At this point, the cellulose acetate membrane is replaced. Then, the standardized water quality decreases to near 0, and the performance is restored. In contrast, as shown in FIG. 5, when the year of operation reaches 8 years, the performance of the cellulose acetate membrane decreases, and the water quality reaches the design value (standardized to 1.0) that needs to be replaced, but when the desalination performance restoration treatment is performed to obtain 50% desalination performance restoration effect, the standardized water quality is decreased to 0.5, the performance is restored, and the operation can be continued. Then, the performance of the cellulose acetate membrane decreases exponentially, and the water quality value increases in the same way. When the standardized water quality reaches near 1.0, the cellulose acetate membrane is replaced at this point, and the performance is restored to the initial state. In other words, if 40% to 50% desalination performance restoration effect is exhibited by the desalination performance restoration treatment of the present disclosure, the life of the cellulose acetate membrane can be extended by 1.5 to 2 years, and the cellulose acetate membrane only needs to be replaced once every 9.5 to 10 years. In addition, although depending on the restoration effect when the desalination performance restoration treatment is performed multiple times, by obtaining the desalination performance restoration effect through the desalination performance restoration treatment without replacing the cellulose acetate membrane, the standardized water quality can be reduced from 1.0 to restore the performance, and the life of the cellulose acetate membrane can be extended while continuing the operation. Here, in the example shown in FIG. 2, the degree of acetylation that results in a desalination performance restoration effect of about 50% or higher is about 15% or more.

For this reason, the degree of acetylation of the modified polyvinyl alcohol in the desalination performance restoration agent is more preferably 15% or more. As described above, the degree of acetylation that results in a desalination performance restoration effect of 9% or higher to suppress the reduction in availability from the current level is 1% or more, but when the degree of acetylation is 15% or more, it is possible to more effectively improve the desalination performance restoration effect on the cellulose acetate membrane and extend the life of the cellulose acetate membrane by years. Further, since the frequency of replacement of the cellulose acetate membrane is reduced, it is possible to improve the availability of the water production plant using the cellulose acetate membrane.

On the other hand, there is an upper limit above which the degree of acetylation of the modified polyvinyl alcohol contained in the desalination performance restoration agent should not be increased. When the degree of acetylation is increased while the concentration and degree of polymerization of the modified polyvinyl alcohol are fixed, the clouding up point, which is a temperature at which the modified polyvinyl alcohol begins to coarsen in the solvent (water) mixed with the modified polyvinyl alcohol, is decreased. When the clouding up point of the modified polyvinyl alcohol contained in the desalination performance restoration agent is lower than the temperature at which the desalination performance restoration agent is used (the temperature of the solvent mixed with the desalination performance restoration agent>the clouding up point of the modified polyvinyl alcohol), the modified polyvinyl alcohol cannot be dispersed in water and aggregates. In this case, the adsorption of the modified polyvinyl alcohol in the solvent (water) to the cellulose acetate membrane decreases, and the coating of the modified polyvinyl alcohol on the entire cellulose acetate membrane decreases, so that the desalination performance restoration effect decreases. Therefore, when the degree of acetylation of the modified polyvinyl alcohol in the desalination performance restoration agent is such that the clouding up point, which is the temperature at which the modified polyvinyl alcohol begins to coarsen in the solvent (water), is higher than the temperature at which the desalination performance restoration agent is used (in the example shown in FIG. 2, 30% or less), the coarsening is less likely to occur. In other words, when the degree of acetylation of the modified polyvinyl alcohol in the desalination performance restoration agent is equal to or less than the upper limit of the degree of acetylation at which the modified polyvinyl alcohol can be dispersed in water (in the example shown in FIG. 2, 30%), the coarsening is less likely to occur. Thus, it is possible to suppress the decrease in the desalination performance restoration effect. Therefore, the degree of acetylation of the modified polyvinyl alcohol in the present disclosure is preferably 1% or more in terms of the desalination performance restoration effect, and the upper limit is 30%.

Figure 6:
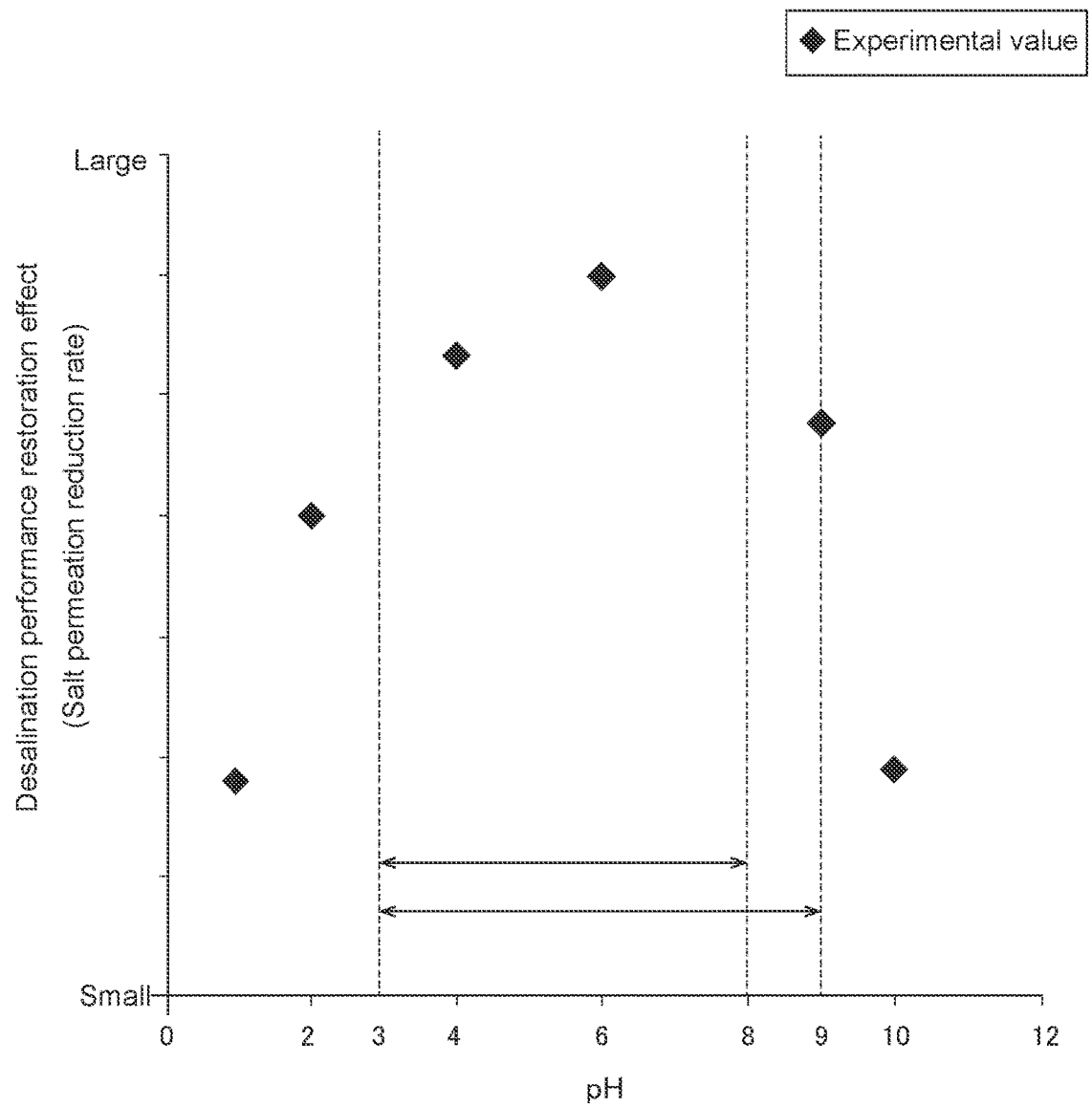
FIG. 6 is a diagram showing a relationship between the desalination performance restoration effect and the pH of the desalination performance restoration agent of the present disclosure.

FIG. 6 is a diagram showing a relationship between the desalination performance restoration effect and the pH of the desalination performance restoration agent of the present disclosure.

It was calculated by prorating from the experimental values obtained from the conditions so as to correspond to the test conditions.

The test conditions of experimental values shown in FIG. 6 are as follows: the concentration, degree of polymerization, and degree of acetylation of the modified polyvinyl alcohol in the desalination performance restoration agent, the temperature of the desalination performance restoration agent, and the circulation time of the desalination performance restoration agent (the time it takes for the desalination performance restoration agent to pass through the cellulose acetate membrane) are all fixed.

As shown in FIG. 3, in order to extend the life of the cellulose acetate membrane by 1.5 to 2 years, the desalination performance restoration effect should be about 50% or higher. From the test results shown in FIG. 6, the pH of the desalination performance restoration agent that results in the desalination performance restoration effect of about 50% or higher is 3 to 9, and the desalination performance restoration effect is near the maximum when the pH is about 6. That is, in order to improve the desalination performance restoration effect, the pH of the desalination performance restoration agent containing the modified polyvinyl alcohol is preferably 3 to 9. Further, in terms of durability to reduce the decrease in the desalination performance due to hydrolysis of the cellulose acetate membrane, the pH of the desalination performance restoration agent containing the modified polyvinyl alcohol is more preferably 3 to 8. Therefore, the pH of the desalination performance restoration agent is preferably 3 to 9, more preferably 3 to 8.

Figure 7:
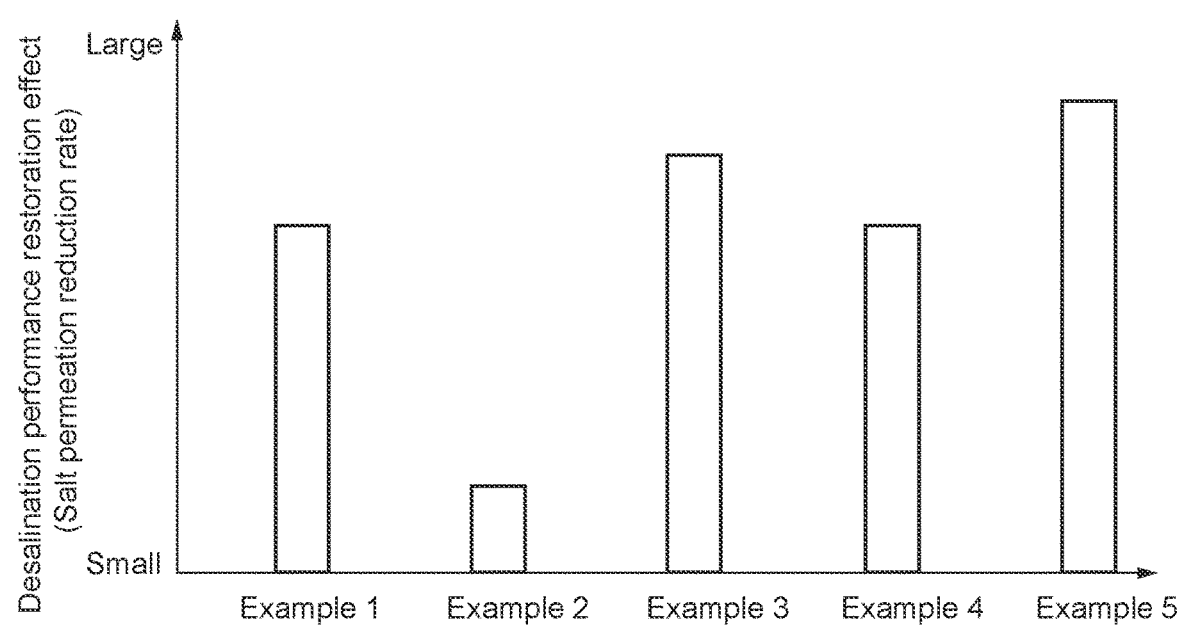
FIG. 7 is a diagram showing results of verification test of the desalination performance restoration effect in some examples.

FIG. 7 is a diagram showing results of verification test of the desalination performance restoration effect in some examples.

In FIG. 7, Examples 1 to 5 are each a verification test result of the desalination performance restoration agent of the present disclosure. In each example, the desalination performance restoration agent was brought into contact with the cellulose acetate membrane to perform the desalination performance restoration treatment of the cellulose acetate membrane.

As the common test conditions of experimental values shown in FIG. 7, the concentration and degree of polymerization of the modified polyvinyl alcohol in the desalination performance restoration agent, and the circulation time of the desalination performance restoration agent (the time it takes for the desalination performance restoration agent to pass through the cellulose acetate membrane) were all fixed. As the specific test conditions for each example, the degree of acetylation of the modified polyvinyl alcohol and the temperature of the desalination performance restoration agent were set as follows: In the test condition of Example 1, the degree of acetylation was 28%, and the temperature of the desalination performance restoration agent was 30° C. In the test condition of Example 2, the degree of acetylation was 12%, and the temperature of the desalination performance restoration agent was 30° C. In the test conditions of Examples 3, 4, and 5, the degree of acetylation was 28%, and the temperature of the desalination performance restoration agent was 50 to 60° C.

Further, as the specific test conditions, in the test conditions of Examples 1, 2, and 3, the desalination performance restoration agent was the modified polyvinyl alcohol alone, and in the test condition of Example 4, before the desalination performance restoration treatment using the desalination performance restoration agent having a degree of acetylation of 28%, the cellulose acetate membrane was washed with citric acid (concentration 1%) and aqueous ammonia. The aqueous ammonia was added until the pH of the washing liquid reached 4. In the test condition of Example 5, citric acid (1% concentration) and aqueous ammonia were added to the modified polyvinyl alcohol in the desalination performance restoration agent having a degree of acetylation of 28%. The aqueous ammonia was added until the pH of the desalination performance restoration agent reached 4.

As shown in FIG. 7, comparing Examples 1 to 3, the desalination performance restoration effect was higher when the degree of acetylation was 28% (Examples 1 and 3) than when the degree of acetylation of the modified polyvinyl alcohol was 12% (Example 2), and the desalination performance restoration effect was slightly higher when the temperature of the desalination performance restoration agent was 50 to 60° C. (Example 3) than when the temperature was 30° C. (Example 1).

As shown in FIG. 7, comparing Examples 3 and 5, the desalination performance restoration effect was higher when citric acid and aqueous ammonia were added (Example 5) than when the desalination performance restoration agent was the modified polyvinyl alcohol alone (Example 3). This indicates that when the modified polyvinyl alcohol having a degree of acetylation of 28% or more is used in combination with citric acid as the organic acid (the desalination performance restoration agent containing the modified polyvinyl alcohol and citric acid is brought into contact with the cellulose acetate membrane) as shown in Example 5, the desalination performance restoration effect is improved as compared with the case where the modified polyvinyl alcohol is used alone as the desalination performance restoration agent (Example 3). In addition, when the desalination performance restoration treatment was performed using the modified polyvinyl alcohol alone as the desalination performance restoration agent after washing the cellulose acetate membrane with citric acid (Example 4), the desalination performance restoration effect was lower than when the membrane was not washed with citric acid (Example 3), while when the modified polyvinyl alcohol was used in combination with citric acid, i.e., when the desalination performance restoration treatment was performed using the desalination performance restoration agent containing the modified polyvinyl alcohol and citric acid (Example 5), the desalination performance restoration effect was higher than when the membrane was not washed with citric acid (Example 3). In Example 5, aqueous ammonia was added until the pH of the desalination performance restoration agent reached 4 in order to prevent the pH of the desalination performance restoration agent from dropping below 3 due to the addition of citric acid and the performance of the cellulose acetate membrane from deteriorating due to hydrolysis (see FIG. 6). It was also confirmed that the decrease in water production performance (the rate at which water permeates the cellulose acetate membrane under a certain operating condition) expected as a side effect of the desalination performance restoration treatment was slight.

Further, it was confirmed that the same high desalination performance restoration effect as in Example 5 was obtained when glycolic acid, tartaric acid, EDTA, and ethane-1-hydroxy-1,1-disulfonic acid were used instead of citric acid in Example 5. Thus, the desalination performance restoration agent that contains the modified polyvinyl alcohol and the organic acid (and a salt of the organic acid) exhibits a high desalination performance restoration effect for the cellulose acetate membrane, regardless of the type of the organic acid, when it comes into contact with the cellulose acetate membrane.

Figure 8:
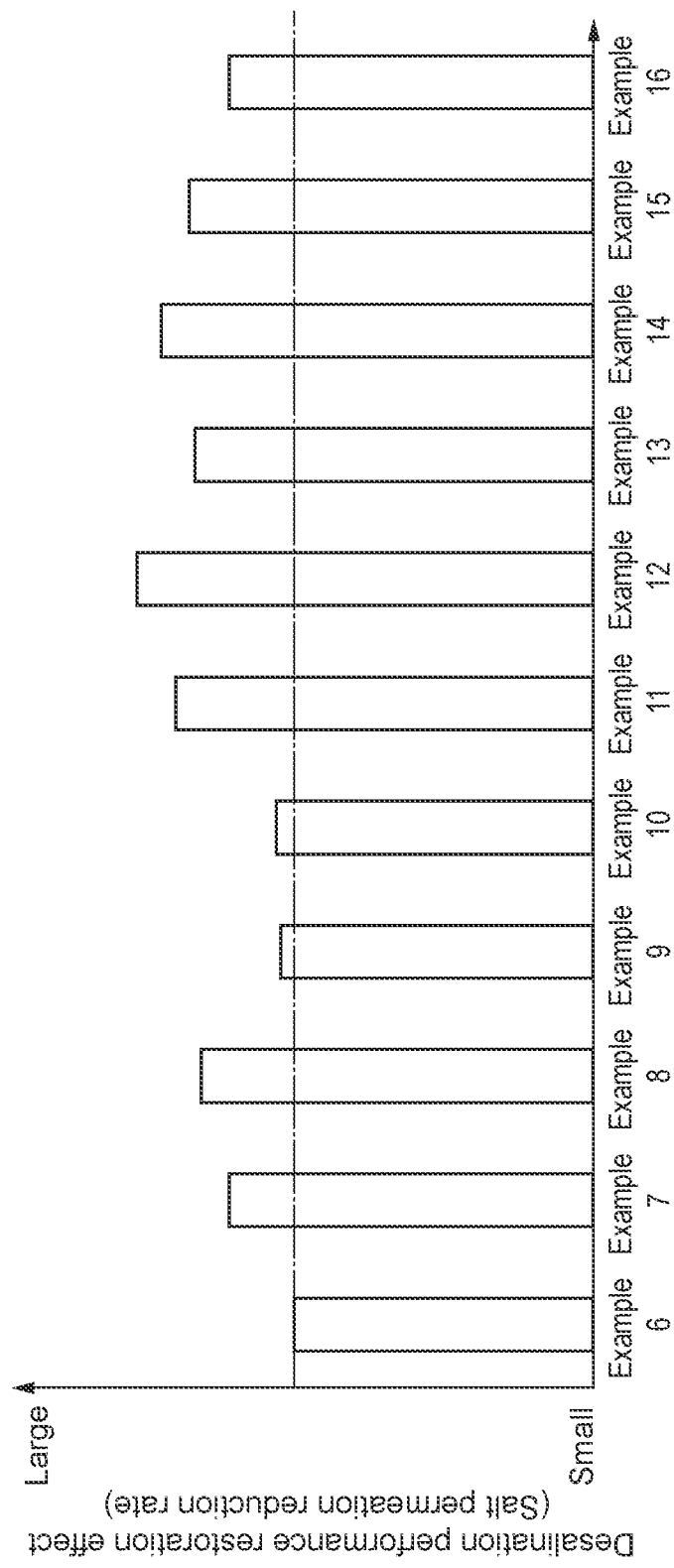
FIG. 8 is a diagram showing results of verification test of the desalination performance restoration effect in other examples.

FIG. 8 is a diagram showing results of verification test of the desalination performance restoration effect in other examples. In FIG. 8, Examples 6 to 16 are each a verification test result of the desalination performance restoration agent of the present disclosure. In each example, the desalination performance restoration agent was brought into contact with the cellulose acetate membrane to perform the desalination performance restoration treatment of the cellulose acetate membrane.

As the common test conditions of experimental values shown in FIG. 8, the concentration (100 ppm), degree of polymerization (500), and degree of acetylation (28%) of the modified polyvinyl alcohol in the desalination performance restoration agent, and the circulation time of the desalination performance restoration agent (6 hours (the time it takes for the desalination performance restoration agent to pass through the cellulose acetate membrane)) were all fixed. As the specific test conditions for each example, as shown in Table 1 below, in Examples 7 to 15, various inorganic salts were added to the modified polyvinyl alcohol at various concentrations. In Example 16, ammonium citrate was added to the modified polyvinyl alcohol to have a concentration of 0.5 mass %. In Example 6, no salt was added to the modified polyvinyl alcohol.

TABLE 1

| Example | Added salt | Concentration of added salt (wt %) |
|---|---|---|
| 6 | — | — |
| 7 | Sodium chloride | 0.1 |
| 8 | Sodium chloride | 0.5 |
| 9 | Sodium chloride | 1 |
| 10 | Sodium sulfate | 0.1 |
| 11 | Sodium sulfate | 0.5 |
| 12 | Sodium sulfate | 1 |
| 13 | Sodium nitrate | 0.1 |
| 14 | Sodium nitrate | 0.5 |
| 15 | Sodium nitrate | 1 |
| 16 | Ammonium citrate | 0.5 |

The comparison between Example 6 and Example 16 corresponds to the comparison between Example 3 and Example 5 in FIG. 7. As shown in FIG. 8, the addition of ammonium citrate to the modified polyvinyl alcohol increased the desalination performance restoration effect compared to the case where ammonium citrate was not added to the modified polyvinyl alcohol, which confirms the same results as shown in FIG. 7. Based on this comparison, comparing Examples 7 to 15 with Example 6, the desalination performance restoration effect was higher than that of Example 6 in all cases, although there was a variation depending on the type of added inorganic salt and concentration, which confirms that the addition of the inorganic salt such as sodium chloride, sodium sulfate, and sodium nitrate increases the desalination performance restoration effect.

According to this result, not only the desalination performance restoration agent that contains the modified polyvinyl alcohol and the organic acid (and a salt of the organic acid), but also the desalination performance restoration agent that contains the modified polyvinyl alcohol and the inorganic salt exhibits a high desalination performance restoration effect for the cellulose acetate membrane by bringing it into contact with the cellulose acetate membrane.

Figure 9:
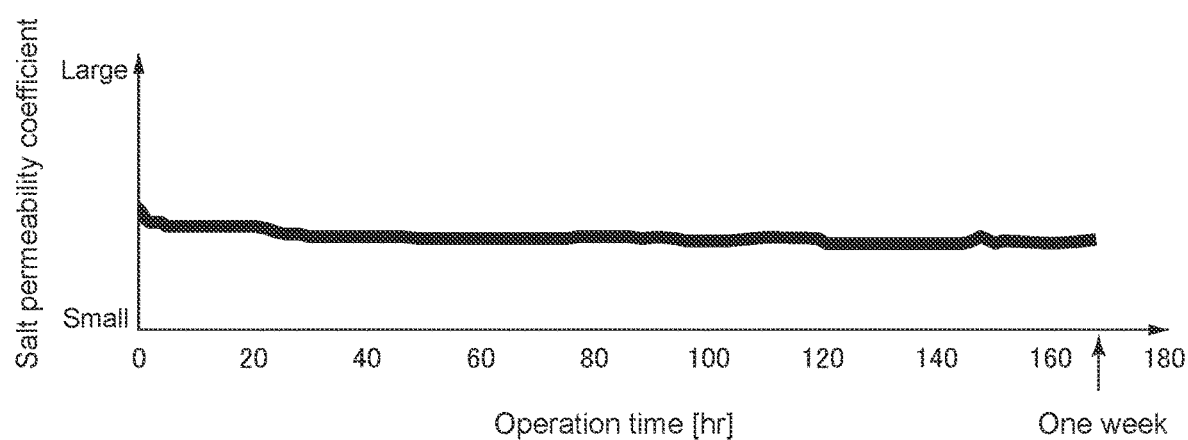
FIG. 9 is a diagram showing a change in the salt permeability coefficient of the cellulose acetate membrane (results of effect maintenance confirmation test) for one week after the desalination performance restoration treatment of the present disclosure is performed.

FIG. 9 is a diagram showing a change in the salt permeability coefficient of the cellulose acetate membrane (results of effect maintenance confirmation test) for one week after the desalination performance restoration treatment of the present disclosure is performed. As shown in FIG. 9, the salt permeability coefficient of the cellulose acetate membrane is generally maintained for one week, and the desalination performance restoration effect is maintained continuously rather than temporarily.

The desalination performance restoration agent of the present disclosure is intended for a cellulose acetate membrane having deteriorated desalination performance, but it can be applied to a cellulose acetate membrane having not deteriorated desalination performance (for example, an unused new membrane) to improve the desalination performance. For example, by producing a cellulose acetate membrane with higher water production and lower desalination performance than before and treating it with the desalination performance restoration agent, it is possible to achieve higher water production than before and the same desalination performance as before.

Figure 10:
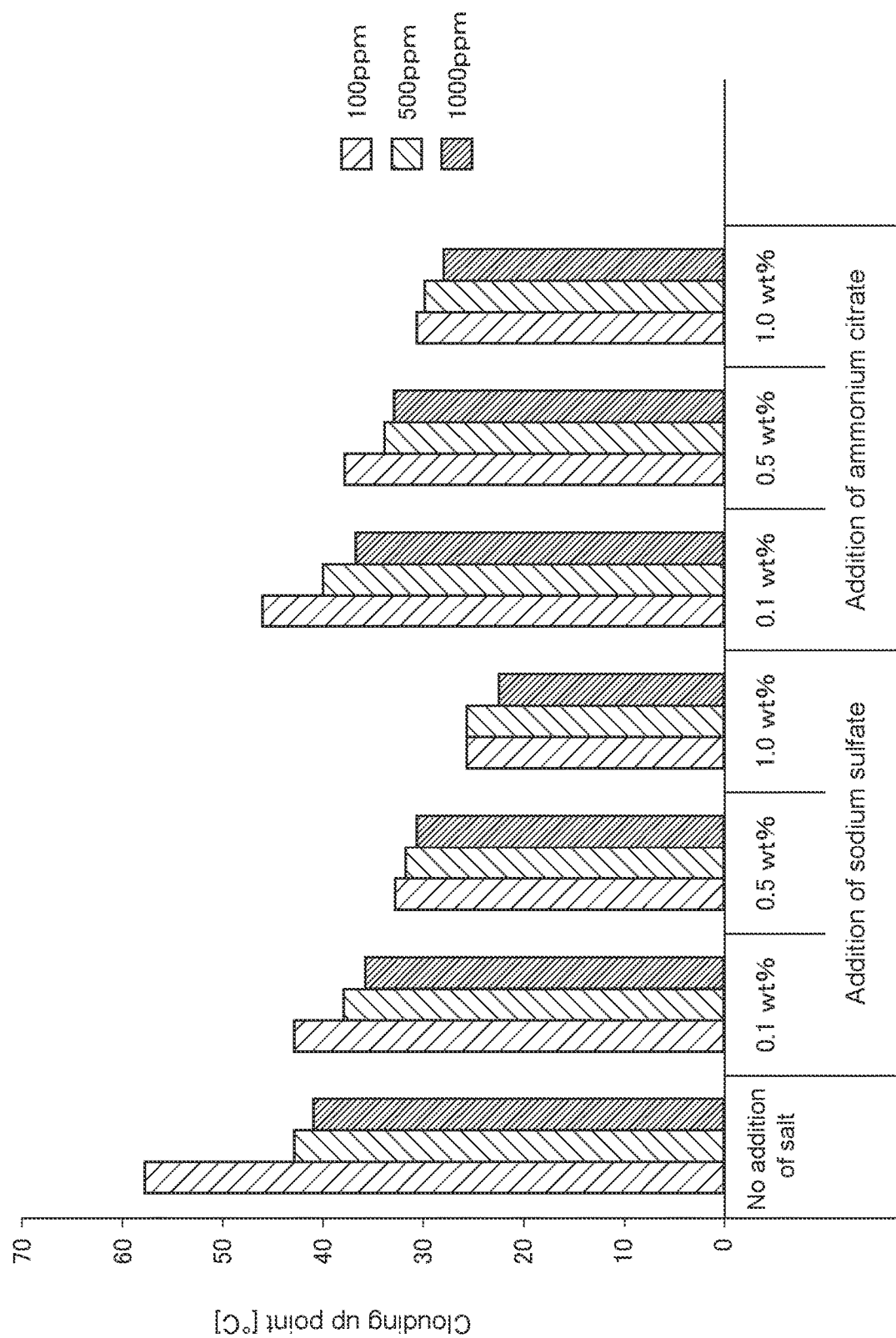
FIG. 10 is an experimental result showing a change in the clouding up point of modified polyvinyl alcohol due to the addition of salt to the modified polyvinyl alcohol.

Referring to FIG. 2, under conditions near the degree of acetylation where the clouding up point is equal to the temperature at which the desalination performance restoration agent is used, the desalination performance restoration effect is high even if the temperature of the used desalination performance restoration agent exceeds the clouding up point. In other words, if the degree of acetylation ranges from a certain lower limit to an upper limit based on the degree of acetylation where the clouding up point is equal to the temperature T at which the desalination performance restoration agent is used, a high desalination performance restoration effect can be obtained. Then, the lower limit and the upper limit were studied. For this study, various salts (sodium sulfate/ammonium citrate) were added to an aqueous solution of modified polyvinyl alcohol having various concentrations (100/500/1000 ppm) and a degree of acetylation of 28%, at various concentration (0.1/0.5/1.0 mass % based on modified polyvinyl alcohol), and changes in the clouding up point of the modified polyvinyl alcohol were measured experimentally. The results are shown in FIG. 10.

The upper limit of the degree of acetylation was considered as follows. Considering the high temperature resistance of the cellulose acetate membrane, the temperature in actual products in which the cellulose acetate membrane is used is 60° C. at the maximum. Referring to FIG. 10, the condition showing the lowest clouding up point is when the concentration of the modified polyvinyl alcohol in the aqueous solution is 1000 ppm and the added sodium sulfate aqueous solution is 1 mass %, and the clouding up point under this condition is 23° C. By determining −40° C. with a slight margin between 60° C. and 23° C., the upper limit is set to the degree of acetylation where the clouding up point is (T−40) ° C.

The lower limit was considered as follows. As shown in FIG. 2, assuming that the degree of acetylation of the modified polyvinyl alcohol to be put into practical use is 28%, the range of practical use is up to a degree of acetylation, taking into account the variation. It has been confirmed that even if the degree of acetylation is 18%, a high desalination performance restoration effect of about 70% can be obtained under the condition of 30° C. Further, according to the inventors' research, it was confirmed that the clouding up point of polyvinyl alcohol having a degree of acetylation of 18% was 80° C. or higher (i.e., the clouding up point could not be confirmed up to 80° C.). Based on this result, the lower limit is set to the degree of acetylation where the clouding up point is (T+50) ° C., using +50° C., the difference between 80° C. and 30° C.

In the range from the degree of acetylation where the clouding up point is equal to the temperature at which the desalination performance restoration agent is used to the lower limit of the degree of acetylation, as already described, when the degree of acetylation is such that the clouding up point of the modified polyvinyl alcohol is higher than the temperature of the desalination performance restoration agent, the decrease in the desalination performance restoration effect can be suppressed. On the other hand, in the range from the degree of acetylation where the clouding up point is equal to the temperature at which the desalination performance restoration agent is used to the upper limit of the degree of acetylation, since the temperature at which the desalination performance restoration agent is used exceeds the clouding up point, the modified polyvinyl alcohol becomes coarsen and turbid. However, under conditions near the degree of acetylation where the clouding up point is equal to the temperature at which the desalination performance restoration agent is used, the desalination performance restoration effect is high even if the temperature of the used desalination performance restoration agent exceeds the clouding up point. Thus, by confirming the turbidity caused by the coarsening of the modified polyvinyl alcohol, the desalination performance of the cellulose acetate membrane can be restored under conditions where the desalination performance restoration is highly effective.

The present disclosure is not limited to the embodiments described above, but includes modifications to the embodiments described above, and embodiments composed of combinations of those embodiments.

The contents described in the above embodiments would be understood as follows, for instance.

(1) A desalination performance restoration agent for a cellulose acetate membrane according to the present disclosure comprises: a solvent; and a modified polyvinyl alcohol mixed in the solvent, and the modified polyvinyl alcohol has an acetyl group structure in at least part of polyvinyl alcohol.

The cellulose acetate membrane has acetyl groups, and the acetyl groups contribute to the desalination performance of the cellulose acetate membrane. It was found that when the cellulose acetate membrane is used as the reverse osmosis membrane which requires the desalination performance, the number of acetyl groups of the cellulose acetate membrane decreases and the number of hydroxyl groups increases (the cellulose acetate membrane deteriorates) with the passage of time of use due to operation, and the desalination performance of the cellulose acetate membrane deteriorates.

The desalination performance restoration agent according to the present disclosure contains the modified polyvinyl alcohol having an acetyl group structure in at least part of polyvinyl alcohol, and the modified polyvinyl alcohol is mixed in the solvent (e.g., water). Thus, the desalination performance restoration agent comes into contact with the entire deteriorated cellulose acetate membrane, and hydrophobic acetyl groups remaining in the deteriorated cellulose acetate membrane and hydrophobic acetyl groups of the modified polyvinyl alcohol in the desalination performance restoration agent are easily adsorbed each other due to their hydrophobicity. This allows the modified polyvinyl alcohol to effectively coat the entire cellulose acetate membrane. Further, the acetyl groups of the modified polyvinyl alcohol adsorbed on the cellulose acetate membrane contribute to the desalination performance of the cellulose acetate membrane, so that the desalination performance of the cellulose acetate membrane can be effectively restored.

(2) In some embodiments, in the desalination performance restoration agent for a cellulose acetate membrane described in the above (1), the degree of acetylation of the modified polyvinyl alcohol is 1% or more.

According to the inventors' studies, it was found that when the temperature of the desalination performance restoration agent is equal to or lower than the clouding up point, the more the degree of acetylation of the modified polyvinyl alcohol, the higher the desalination performance restoration effect. Therefore, when the degree of acetylation of the modified polyvinyl alcohol is 1% or more as described in the above (2), a higher desalination performance restoration effect is exhibited than when the degree of acetylation is less than 1%. In a conventional operation, when the cellulose acetate membrane is clogged, cleaning is periodically performed to wash off the dirt on the membrane. In order to control the reduction in availability of the water production plant caused by the desalination performance restoration treatment at this time, the desalination performance restoration effect should be 9% or higher, and at this time, the degree of acetylation should be 1% or more. In this case, it is possible to reduce the frequency of replacement of the cellulose acetate membrane, and thus prevent the availability of the water production plant using the cellulose acetate membrane from being lower than when the current cleaning process is performed.

(3) In some embodiments, in the desalination performance restoration agent for a cellulose acetate membrane described in the above (2), the degree of acetylation of the modified polyvinyl alcohol is 15% or more.

With the desalination performance restoration agent for a cellulose acetate membrane described in the above (3), a higher desalination performance restoration effect is exhibited than when the degree of acetylation is less than 15%. When the degree of acetylation is 15% or more, it is possible to more effectively improve the desalination performance restoration effect on the cellulose acetate membrane and extend the life of the cellulose acetate membrane by years. Accordingly, it is possible to reduce the frequency of replacement of the cellulose acetate membrane.

(4) In some embodiments, in the desalination performance restoration agent for a cellulose acetate membrane described in the above (2) or (3), the degree of acetylation of the modified polyvinyl alcohol is 30% or less.

When the temperature of the desalination performance restoration agent exceeds the clouding up point, the modified polyvinyl alcohol begins to coarsen in the solvent, the adsorption of the modified polyvinyl alcohol to the cellulose acetate membrane decreases, and the coating of the modified polyvinyl alcohol on the entire cellulose acetate membrane decreases, so that it is difficult to obtain the desalination performance restoration effect. Therefore, when the degree of acetylation of the modified polyvinyl alcohol is 30% or less as described in the above (4), the coarsening is less likely to occur than when the degree of acetylation exceeds 30%. Thus, it is possible to suppress the decrease in the desalination performance restoration effect.

(5) In some embodiments, in the desalination performance restoration agent for a cellulose acetate membrane described in any one of the above (1) to (4), the pH of the desalination performance restoration agent is in a range of 3 to 8.

With the desalination performance restoration agent for a cellulose acetate membrane described in the above (5), in this pH range, a desalination performance restoration effect of about 30% or higher can be obtained, and the life of the cellulose acetate membrane can be extended by years. Further, the decrease in the desalination performance due to hydrolysis of the cellulose acetate membrane can be suppressed, and a high desalination performance restoration effect can be obtained.

(6) In some embodiments, the desalination performance restoration agent for a cellulose acetate membrane described in any one of the above (1) to (5) further comprises an organic acid and a salt of the organic acid.

Examples of the organic acid include carboxylic acids such as glycolic acid, diglycolic acid, oxydisuccinic acid, carboxymethyloxysuccinic acid, citric acid, lactic acid, tartaric acid, oxalic acid, malic acid, gluconic acid, adipic acid, sveric acid, and salts thereof, aminocarboxylic acids such as nitrilotriacetic acid, ethylenediaminetetraacetic acid, diethylenetriaminepentaacetic acid, triethylenetetraminehexacetic acid, and salts thereof, and phosphonic acids such as ethane-1,1-diphosphonic acid, ethane-1,1,2-triphosphonic acid, ethane-1-hydroxy-1,1-diphosphonic acid, ethane-1-hydroxy-1,2-diphosphonic acid, ethane-1-hydroxy-1,1,2-triphosphonic acid, ethane-1-dicarboxy-1,2-diphosphonic acid, and methanehydroxyphosphonic acid and salts thereof.

With the desalination performance restoration agent for a cellulose acetate membrane described in the above (6), since the modified polyvinyl alcohol is used in combination with an organic acid and a salt of the organic acid (the desalination performance restoration agent containing the modified polyvinyl alcohol and the organic acid and salt of the organic acid is brought into contact with the cellulose acetate membrane), the desalination performance restoration effect can be improved as compared with the case of using the modified polyvinyl alcohol alone. Further, the desalination performance restoration effect can be improved as compared with the case where the desalination performance restoration treatment is performed using the modified polyvinyl alcohol alone after washing the cellulose acetate membrane with an organic acid and a salt of the organic acid.

(7) In some embodiments, the desalination performance restoration agent for a cellulose acetate membrane described in any one of the above (1) to (5) further comprises an inorganic salt.

Examples of the inorganic salt include sodium chloride, sodium sulfate, and sodium nitrate. As other examples of the inorganic salt, salts of hydrochloric acid, sulfuric acid, nitric acid, and phosphoric acid can also be used.

With the desalination performance restoration agent for a cellulose acetate membrane described in the above (7), since the modified polyvinyl alcohol is used in combination with an inorganic salt (the desalination performance restoration agent containing the modified polyvinyl alcohol and the inorganic salt is brought into contact with the cellulose acetate membrane), the desalination performance restoration effect can be improved as compared with the case of using the modified polyvinyl alcohol alone.

(8) A desalination performance restoration method for a cellulose acetate membrane according to the present disclosure comprises: a step of bringing a desalination performance restoration agent that contains a solvent and a modified polyvinyl alcohol having an acetyl group structure in at least part of polyvinyl alcohol into contact with a cellulose acetate membrane.

With the desalination performance restoration method for a cellulose acetate membrane described in the above (8), the modified polyvinyl alcohol mixed in the solvent (e.g., water) comes into contact with the entire deteriorated cellulose acetate membrane, and hydrophobic acetyl groups remaining in the deteriorated cellulose acetate membrane and hydrophobic acetyl groups of the modified polyvinyl alcohol mixed in the solvent in the desalination performance restoration agent are easily adsorbed each other due to their hydrophobicity. This allows the modified polyvinyl alcohol to effectively coat the entire cellulose acetate membrane. Further, the acetyl groups of the modified polyvinyl alcohol adsorbed on the cellulose acetate membrane contribute to the desalination performance of the cellulose acetate membrane, so that the desalination performance of the cellulose acetate membrane can be effectively restored.

(9) In some embodiments, in the desalination performance restoration method for a cellulose acetate membrane described in the above (8), the step includes bringing a desalination performance restoration agent that contains a modified polyvinyl alcohol having a degree of acetylation of 1% or more into contact with the cellulose acetate membrane.

According to the inventors' studies, it was found that when the temperature of the desalination performance restoration agent is equal to or higher than the clouding up point, the more the degree of acetylation of the modified polyvinyl alcohol, the higher the desalination performance restoration effect. Therefore, when the desalination performance restoration agent that contains the modified polyvinyl alcohol having a degree of acetylation of 1% or more is brought into contact with the cellulose acetate membrane as described in the above (9), a higher desalination performance restoration effect is exhibited than when the degree of acetylation is less than 1%. In a conventional operation, cleaning is periodically performed to wash off the dirt on the cellulose acetate membrane. In order to control the reduction in availability of the water production plant caused by the desalination performance restoration treatment at this time, the desalination performance restoration effect should be 9% or higher, and at this time, the degree of acetylation should be 1% or more. In this case, it is possible to reduce the frequency of replacement of the cellulose acetate membrane, and thus prevent the availability of the water production plant using the cellulose acetate membrane from being lower than when the current cleaning process is performed.

(10) In some embodiments, in the desalination performance restoration method for a cellulose acetate membrane described in the above (9), the step includes bringing a desalination performance restoration agent that contains a modified polyvinyl alcohol having a degree of acetylation of 15% or more into contact with the cellulose acetate membrane.

With the desalination performance restoration method for a cellulose acetate membrane described in the above (10), a higher desalination performance restoration effect is obtained than when the degree of acetylation is less than 15%, and the life of the cellulose acetate membrane can be extended by years. Accordingly, it is possible to reduce the frequency of replacement of the cellulose acetate membrane.

(11) In some embodiments, in the desalination performance restoration method for a cellulose acetate membrane described in the above (9) or (10), in the step, degree of acetylation of the modified polyvinyl alcohol is such that a clouding up point, which is a temperature at which the modified polyvinyl alcohol begins to coarsen in the solvent of the desalination performance restoration agent, is higher than a temperature of the desalination performance restoration agent.

When the degree of acetylation is excessively increased, the clouding up point is decreased lower than the temperature of the desalination performance restoration agent, and the modified polyvinyl alcohol begins to coarsen in the solvent. Accordingly, the adsorption of the modified polyvinyl alcohol to the cellulose acetate membrane decreases, and the coating of the modified polyvinyl alcohol on the entire cellulose acetate membrane decreases, so that it is difficult to obtain the desalination performance restoration effect. Therefore, when the degree of acetylation of the modified polyvinyl alcohol is such that the clouding up point, which is a temperature at which the modified polyvinyl alcohol begins to coarsen in the solvent of the desalination performance restoration agent, is higher than the temperature of the desalination performance restoration agent as described in the above (11), the coarsening is less likely to occur. Thus, it is possible to suppress the decrease in the desalination performance restoration effect.

(12) In some embodiments, in the desalination performance restoration method for a cellulose acetate membrane described in the above (9) or (10), in the step, degree of acetylation of the modified polyvinyl alcohol is such that a clouding up point, which is a temperature at which the modified polyvinyl alcohol begins to coarsen in the solvent of the desalination performance restoration agent, is in a range from a lower limit to an upper limit based on a degree of acetylation where the clouding up point is equal to a temperature T of the desalination performance restoration agent. The upper limit is a degree of acetylation where the clouding up point is (T−40) ° C., and the lower limit is a degree of acetylation where the clouding up point is (T+50) ° C.

In the range from the degree of acetylation where the clouding up point is equal to the temperature at which the desalination performance restoration agent is used to the lower limit of the degree of acetylation, the same effect as in the above (11) can be obtained. On the other hand, in the range from the degree of acetylation where the clouding up point is equal to the temperature at which the desalination performance restoration agent is used to the upper limit of the degree of acetylation, since the temperature at which the desalination performance restoration agent is used exceeds the clouding up point, the modified polyvinyl alcohol becomes coarsen and turbid. However, under conditions near the degree of acetylation where the clouding up point is equal to the temperature at which the desalination performance restoration agent is used, the desalination performance restoration effect is high even if the temperature of the used desalination performance restoration agent exceeds the clouding up point. Thus, by confirming the turbidity caused by the coarsening of the modified polyvinyl alcohol, the desalination performance of the cellulose acetate membrane can be restored under conditions where the desalination performance restoration is highly effective.

(13) In some embodiments, in the desalination performance restoration method for a cellulose acetate membrane described in any one of the above (9) to (12), the step includes bringing a desalination performance restoration agent that contains a modified polyvinyl alcohol having a degree of acetylation of 30% or less into contact with the cellulose acetate membrane.

With the desalination performance restoration method for a cellulose acetate membrane described in the above (13), since the degree of acetylation of the modified polyvinyl alcohol is 30% or less, the coarsening is less likely to occur than when the degree of acetylation exceeds 30%, and the coating of modified polyvinyl alcohol on the entire cellulose acetate membrane can be maintained. Thus, it is possible to suppress the decrease in the desalination performance restoration effect.

(14) In some embodiments, in the desalination performance restoration method for a cellulose acetate membrane described in any one of the above (8) to (13), the step includes bringing the desalination performance restoration agent having a pH of 3 to 8 into contact with the cellulose acetate membrane.

With the desalination performance restoration method for a cellulose acetate membrane described in the above (14), in this pH range, a desalination performance restoration effect of about 30% or higher can be obtained, and the life of the cellulose acetate membrane can be extended by years. Further, the decrease in the desalination performance due to hydrolysis of the cellulose acetate membrane can be suppressed, and a high desalination performance restoration effect can be obtained.

(15) In some embodiments, in the desalination performance restoration method for a cellulose acetate membrane described in any one of the above (8) to (14), the step includes bringing the desalination performance restoration agent that further contains an organic acid and a salt of the organic acid into contact with the cellulose acetate membrane.

With the desalination performance restoration method for a cellulose acetate membrane described in the above (15), since the modified polyvinyl alcohol is used in combination with an organic acid and a salt thereof (the desalination performance restoration agent containing the modified polyvinyl alcohol and the organic acid and salt thereof is brought into contact with the cellulose acetate membrane), the desalination performance restoration effect can be improved as compared with the case of using the modified polyvinyl alcohol alone. Further, the desalination performance restoration effect can be improved as compared with the case where the desalination performance restoration treatment is performed using the modified polyvinyl alcohol alone after washing the cellulose acetate membrane with citric acid.

(16) In some embodiments, in the desalination performance restoration method for a cellulose acetate membrane described in any one of the above (8) to (14), the step includes bringing the desalination performance restoration agent that further contains an inorganic salt into contact with the cellulose acetate membrane.

With the desalination performance restoration method for a cellulose acetate membrane described in the above (16), since the modified polyvinyl alcohol is used in combination with an inorganic salt (the desalination performance restoration agent containing the modified polyvinyl alcohol and the inorganic salt is brought into contact with the cellulose acetate membrane), the desalination performance restoration effect can be improved as compared with the case of using the modified polyvinyl alcohol alone.

(17) A desalination performance improvement method for a cellulose acetate membrane according to the present disclosure comprises: a step of bringing a desalination performance restoration agent that contains a solvent and a modified polyvinyl alcohol having an acetyl group structure in at least part of polyvinyl alcohol into contact with an unused cellulose acetate membrane.

With the desalination performance improvement method for a cellulose acetate membrane described in the above (17), it is possible to improve the desalination performance of an unused cellulose acetate membrane whose desalination performance has not deteriorated. For example, by producing a cellulose acetate membrane with higher water production and lower desalination performance than before and treating it with the desalination performance restoration agent, it is possible to achieve higher water production than before and the same desalination performance as before. The desalination performance improvement method described in the above (9) to (16) may be applied to an unused cellulose acetate membrane as described in the above (17).

REFERENCE SIGNS LIST

2 Cleaning device
4 Tank
6 Pump
8 Filter
10 Circulation line
12 Cellulose acetate membrane
14 Pipe

The invention claimed is:

1. An agent comprising:
a solvent,
a modified polyvinyl alcohol mixed in the solvent,
an organic acid, and
a salt of the organic acid,
wherein the modified polyvinyl alcohol has an acetyl group structure in at least part of polyvinyl alcohol, and
wherein the organic acid is selected from the group consisting of glycolic acid, diglycolic acid, oxydisuccinic acid, carboxymethyloxysuccinic acid, citric acid, lactic acid, tartaric acid, oxalic acid, malic acid, gluconic acid, adipic acid, sveric acid, nitrilotriacetic acid, ethylenediaminetetraacetic acid, diethylenetriaminepentaacetic acid, triethylenetetraminehexacetic acid, and mixtures thereof.

2. The agent according to claim 1,
wherein degree of acetylation of the modified polyvinyl alcohol is 1% or more.

3. The agent according to claim 2,
wherein degree of acetylation of the modified polyvinyl alcohol is 15% or more.

4. The agent according to claim 2,
wherein degree of acetylation of the modified polyvinyl alcohol is 30% or less.

5. The agent according to claim 1,
wherein pH of the agent is in a range of 3 to 8.

6. The agent according to claim 1, further comprising an inorganic salt.

7. A desalination performance restoration method for a cellulose acetate membrane, comprising a step of bringing the agent according to claim 1 into contact with a cellulose acetate membrane, wherein the agent is a desalination performance restoration agent.

8. The desalination performance restoration method for a cellulose acetate membrane according to claim 7,
wherein the agent has a degree of acetylation of 1% or more.

9. The desalination performance restoration method for a cellulose acetate membrane according to claim 8,
wherein the agent has a degree of acetylation of 15% or more.

10. The desalination performance restoration method for a cellulose acetate membrane according to claim 8,
wherein, in the step, the modified polyvinyl alcohol has a degree of acetylation such that a clouding up point, which is a temperature at which the modified polyvinyl alcohol begins to coarsen in the solvent of the desalination performance restoration agent, is higher than a temperature of the agent.

11. The desalination performance restoration method for a cellulose acetate membrane according to claim 8,
wherein, in the step, the modified polyvinyl alcohol has a degree of acetylation such that a clouding up point, which is a temperature at which the modified polyvinyl alcohol begins to coarsen in the solvent of the desalination performance restoration agent, is in a range from a lower limit to an upper limit based on a degree of acetylation where the clouding up point is equal to a temperature T of the agent, and
wherein the upper limit is a degree of acetylation where the clouding up point is $(T-40)°$ C., and the lower limit is a degree of acetylation where the clouding up point is $(T+50)°$ C.

12. The desalination performance restoration method for a cellulose acetate membrane according to claim 8,
wherein agent has a degree of acetylation of 30% or less.

13. The desalination performance restoration method for a cellulose acetate membrane according to claim 7,
wherein the agent has a pH of 3 to 8.

14. The desalination performance restoration method for a cellulose acetate membrane according to claim 7,
wherein the agent further contains an organic acid and a salt of the organic acid.

15. The desalination performance restoration method for a cellulose acetate membrane according to claim 7,
wherein the agent further contains an inorganic salt.

16. A desalination performance improvement method for a cellulose acetate membrane, comprising a step of bringing the agent according to claim 1 into contact with an unused cellulose acetate membrane.

17. The agent according to claim 1, further comprising an inorganic salt,
wherein the inorganic salt is selected from the group consisting of salt of hydrochloric acid, salt of sulfuric acid, salt of nitric acid, sodium chloride, and mixtures thereof.

* * * * *